US009032368B2

(12) United States Patent
Polakam et al.

(10) Patent No.: US 9,032,368 B2
(45) Date of Patent: May 12, 2015

(54) DYNAMIC CONFIGURATION SYSTEM

(75) Inventors: Sarabhaiah Polakam, Chester Springs, PA (US); Darin Michael DeFer, Dallas, TX (US); John Andres Lozes, Wilmington, DE (US); Christopher Alan Moore, San Jose, CA (US); Peter Anthony Tavormina, Hainesport, NJ (US); Ying Huang, Andover, MA (US)

(73) Assignee: Bank of America Corporation, Charlotte, NC (US)

( * ) Notice: Subject to any disclaimer, the term of this patent is extended or adjusted under 35 U.S.C. 154(b) by 671 days.

(21) Appl. No.: 12/771,807

(22) Filed: Apr. 30, 2010

(65) Prior Publication Data

US 2011/0047535 A1 Feb. 24, 2011

Related U.S. Application Data

(60) Provisional application No. 61/236,135, filed on Aug. 23, 2009.

(51) Int. Cl.
G06F 9/44 (2006.01)
G06F 9/54 (2006.01)

(52) U.S. Cl.
CPC . G06F 9/542 (2013.01); G06F 8/70 (2013.01); G06F 2209/543 (2013.01)

(58) Field of Classification Search
CPC .................................. G06F 9/542; G06F 8/70
USPC .................................................. 717/121, 168
See application file for complete search history.

(56) References Cited

U.S. PATENT DOCUMENTS

| 6,751,657 | B1 | 6/2004 | Zothner |
| 7,085,927 | B1 | 8/2006 | Kohli |
| 7,231,496 | B2* | 6/2007 | Curtis ........................... 711/137 |
| 8,140,362 | B2* | 3/2012 | Deshpande et al. ......... 705/7.11 |
| 8,261,282 | B1* | 9/2012 | Ponnapur et al. ............. 718/105 |
| 2002/0042835 | A1* | 4/2002 | Pepin et al. ................... 709/232 |
| 2005/0091373 | A1 | 4/2005 | Ciapala et al. |
| 2006/0168536 | A1 | 7/2006 | Portmann |
| 2006/0212376 | A1* | 9/2006 | Snyder et al. ................... 705/35 |
| 2007/0208832 | A1 | 9/2007 | Traub et al. |

(Continued)

FOREIGN PATENT DOCUMENTS

| CN | 101187878 A | 5/2008 |
| CN | 101258495 A | 9/2008 |
| WO | 0191010 A1 | 11/2001 |

OTHER PUBLICATIONS

Oracle, "Oracle Database—Application Developer's Guide—Fundamentals", Nov. 2005, pp. 13-1 through 13-19.*

(Continued)

Primary Examiner — Wei Zhen
Assistant Examiner — Lanny Ung
(74) Attorney, Agent, or Firm — Banner & Witcoff, Ltd.; Michael A. Springs

(57) ABSTRACT

Systems and methods are illustrated that relate to a dynamic configuration of rules (e.g., business rules, presentation rules, and the like) in a virtual machine environment. Moreover, the rules may be updated and used with an application that is running on a virtual machine without requiring the virtual machine to be stopped and started (i.e., restarted). Furthermore, aspects of the disclosure describe managing the visibility of dynamic rules to various applications running on the same virtual machine.

15 Claims, 4 Drawing Sheets

(56) References Cited

U.S. PATENT DOCUMENTS

| | | |
|---|---|---|
| 2008/0141141 A1 | 6/2008 | Moore et al. |
| 2008/0148283 A1 | 6/2008 | Allen et al. |
| 2008/0172600 A1 | 7/2008 | Bokor |
| 2008/0255962 A1 | 10/2008 | Chang et al. |
| 2009/0094339 A1 | 4/2009 | Allen et al. |
| 2009/0112824 A1 | 4/2009 | Fu et al. |
| 2010/0138316 A1 | 6/2010 | Connors et al. |

OTHER PUBLICATIONS

Struts 2 in Action, Donald Brown et al., © 2008 by Manning Publications Co., 5 pages.
U.S. Office Action for U.S. Appl. No. 12/771,802, filed Apr. 30, 2010, mailed Feb. 28, 2012.
MassLight, Chapter 4. Introduction to Struts, © Feb. 2001, MassLight, Inc., 20 pages.
Overview of Monitoring and Management, downloaded Feb. 13, 2010, 4 pages.
Oracle® Database Application Developer's Guide—Fundaments 10g Release 2 (10.2), 13 Developing Applications with Database Change Notification, © 1996, 2005, 18 pages.
The Apache Software Foundation, Struts 1—Welcome, © 2000-2008 Apache Software Foundation, 3 pages.
W3C® Cross-Origin Resource Sharing, Editor's Draft Dec. 23, 2009, http://dev.w3.org/2006/waf/access-control/, downloaded Jan. 21, 2010, 26 pages.
Virtual machine, http://en.wikipedia.org/wiki/Virtual_machine, downloaded Dec. 21, 2009, 8 pages.
Java Management Extensions, http://en.wikipedia.org/wiki/Java_Management_Extensions, downloaded Dec. 21, 2009, 3 pages.
Oracle Database, http://en.wikipedia.org/wiki/Oracle_database, downloaded Dec. 21, 2009, 12 pages.
Ajax (programming), http://en.wikipedia.org/wiki/Ajax_(programming), downloaded Jan. 21, 2010, 3 pages.
Ajax framework, http://en.wikipedia.org/wiki/Ajax_framework, downloaded Jan. 21, 2010, 3 pages.
A Java geek, JMX use cases, http://blog.frankel.ch/tech/dev/java/jmx-use-cases, downloaded Dec. 21, 2009, 5 pates.
European Search Report dated Jan. 21, 2011, Application No. 10251484.1-2211, 8 pages.
Reading from ini file and subscribing to Add/Edit/Delete events, Apr. 19, 2009, http://mycomponent.blogspot.com/2009/04/reading-from-ini-file-and-subscribing.html, retrieved on Apr. 1, 2011, 32 pages.
European Search Report dated Jan. 11, 2011, Application No. 10251482.5-2211, 7 pages.
"Store PHP Code in a MySQL Database," Angela Bradley, http://web.archive.org/web/20080401082803/http://php.about.com/od/phpwithmysql/qt/php_in_mysql.htm, dated Apr. 1, 2008, 1 page.
"PHP Login script Tutorial, " http://web/archive.org/web/20070915191038/http://www.phpeasystep.com/phptu/6.htm, dated Sep. 15, 2007.
Chinese Patent Application No. 201010535086.X First Office Action dated Jun. 9, 2014 including translation.

\* cited by examiner

400

412 — `<param-name> Prefix.Firstwebsite.color <param-name>`
`<param-value> blue <param-value>`

`<param-name> Prefix.Firstwebsite.pilotMode <param-name>`
`<param-value> TRUE <param-value>`

410 — `<param-name> Prefix.Firstwebsite.connectionPool <param-name>`
`<param-value> 4 <param-value>`

406 — `<param-name> Prefix.Firstwebsite.contentRetrieval <param-name>`
`<param-value> contentserver2 <param-value>`

414 — `<param-name> Prefix.Firstwebsite.forcedCacheRefresh <param-name>`
`<param-value> TRUE <param-value>`

408 — `<param-name> Prefix.Firstwebsite.logging <param-name>`
`<param-value> 5 <param-value>`

`<param-name> Prefix.Secondwebsite.color <param-name>`
`<param-value> yellow <param-value>`

`<param-name> Prefix.Secondwebsite.contentRetrieval <param-name>`
`<param-value> contentserver3 <param-value>`

402 — `<param-name> Prefix.Secondwebsite.MortgageCalculator <param-name> <param-value> TRUE <param-value>`

404 — `<param-name> Prefix.Secondwebsite.loginNext <param-name>`
`<param-value> information verification <param-value>`

FIG. 4

DYNAMIC CONFIGURATION SYSTEM

This application claims priority from U.S. provisional application Ser. No. 61/236,135, filed Aug. 23, 2009, the contents of which are herein incorporated by reference in their entirety.

RELATED APPLICATION

This application is related to U.S. application Ser. No 12/771,238, entitled "Widget Framework," which was concurrently filed with this application on Apr. 30, 2010.

TECHNICAL FIELD

Aspects of the disclosure relate to computer systems running virtual machines. More specifically, aspects of the disclosure relate to dynamic configuration of rules in a virtual machine environment.

BACKGROUND

Java Management Extensions (JMX) is a known library extension to the JAVA programming language. JMX has been described as "a Java technology that supplies tools for managing and monitoring applications, system objects, devices (e. g. printers) and service oriented networks. Those resources are represented by objects called managed beans). In the API, classes can be dynamically loaded and instantiated."

A known blogger blogged in June 2009 about various JMX use cases, including using JMX to manage an application's configuration, explaining that "[e]ven though each application has different needs regarding configuration (one needing a initial thread number attribute, the other an URL), every application needs to be more or less parameterized. In order to do this, countless generations of Java developers . . . have created two components: [1] the first one is a property file where one puts the name value pairs, [2] the other one is a Java class whose responsibilities are to load the properties in itself and to provide access to the values . . . This is good and fine for initialization, but what about runtime changes of those parameters? This is where JMX comes in. With JMX, you can now expose those parameters with read/write authorizations. JDK 6 provides you with the JConsole application, which can connect on JMX-enabled applications."

Meanwhile, a well-known database vendor provides a feature found in numerous versions of its database software system. The documentation explains that "Database Change Notification is a feature that enables client applications to register queries with the database and receive notifications in response to DML or DDL changes on the objects associated with the queries. The notifications are published by the database when the DML or DDL transaction commits."

BRIEF SUMMARY

The following presents a simplified summary of the disclosure in order to provide a basic understanding of some aspects. It is not intended to identify key or critical elements of the invention or to delineate the scope of the invention. The following summary merely presents some concepts of the disclosure in a simplified form as a prelude to the more detailed description provided below.

In accordance with aspects of the disclosure, a method of updating rules (e.g., business rules) used with an application that is running on a virtual machine is disclosed. The steps include loading the rules after starting up the virtual machine, instantiating an application in the virtual machine, registering to receive notification of runtime modification of the rules, receiving a notification, and updating the application with the modified rule. In addition, aspects of the disclosure describe restricting access to particular rules based on the application running on the virtual machine. As such, a first set of business rules may be accessible to a first application, but not to a second application running on the same virtual machine.

In another embodiment in accordance with aspects of the disclosure, an apparatus is disclosed comprising a virtual machine, computer memory, an interface to a change notification mechanism, a rules control mechanism, and/or a display interface. In an alternate embodiment the computer memory may be wholly or partially located in a data storage system.

One skilled in the art will appreciate that one or more of the aforementioned methods and features may be embodied as computer-executable instructions stored on a computer-readable medium and executed by a processor.

BRIEF DESCRIPTION OF THE DRAWINGS

The present disclosure is illustrated by way of example and not limited in the accompanying figures in which like reference numerals indicate similar elements and in which:

FIG. 4 illustrates an exemplary rules file in accordance with aspects of the disclosure.

DETAILED DESCRIPTION

In accordance with various aspects of the disclosure, systems and methods are illustrated involving computer systems running virtual machines. More specifically, aspects of the disclosure relate to dynamic configuration of rules (e.g., business rules, presentation rules, and the like) in a virtual machine environment. Furthermore, aspects of the disclosure describe systems and methods for managing the visibility of dynamic rules to various applications running on the same virtual machine.

Figure 1:
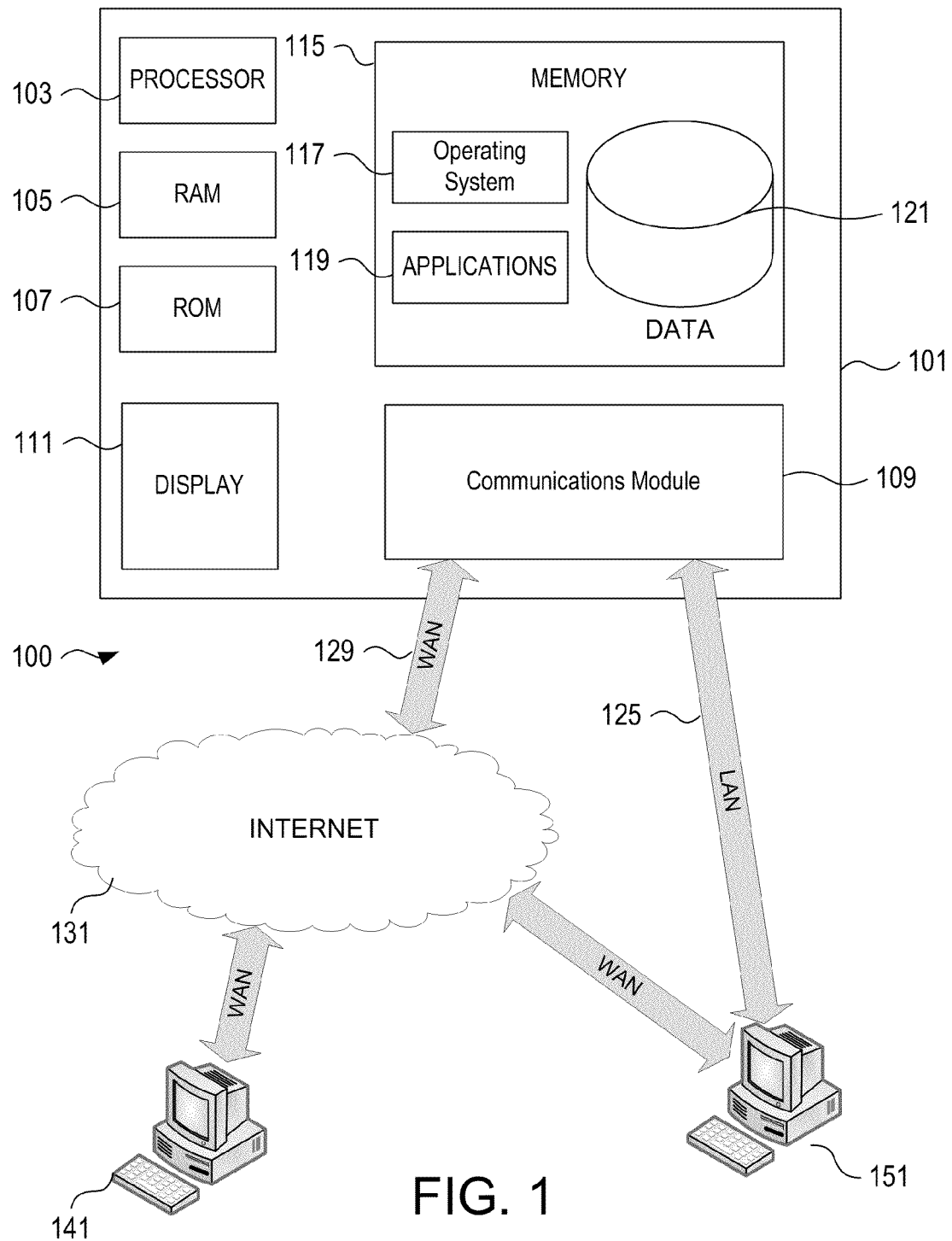
FIG. 1 illustrates a schematic diagram of a general-purpose digital computing environment in which various aspects of the disclosure may be implemented.

FIG. 1 illustrates an example of a suitable computing system environment 100 that may be used according to one or more illustrative embodiments of the invention. The computing system environment 100 is only one example of a suitable computing environment and is not intended to suggest any limitation as to the scope of use or functionality of the invention. The computing system environment 100 should not be interpreted as having any dependency or requirement relating to any one or combination of components illustrated in the computing system environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Aspects of the invention may be described in the general context of computer-executable instructions, such as program modules, being executed by a computer. Generally, program modules include routines, programs, objects, components, data structures, and the like that perform particular tasks or implement particular abstract data types. Aspects of the invention may also be practiced in distributed computing environments where tasks are performed by remote processing devices that are linked through a communications network. In a distributed computing environment, program modules may be located in both local and remote computer storage media including memory storage devices.

With reference to FIG. 1, the computing system environment 100 may include a computing device 101 having a processor 103 for controlling overall operation of the computing device 101 and its associated components, including RAM 105, ROM 107, communications module 109, and memory 115. Computing device 101 typically includes a variety of computer readable media. Computer readable media may be any available media that may be accessed by computing device 101 and include both volatile and nonvolatile media, removable and non-removable media. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computing device 101. Communication media typically embodies computer readable instructions, data structures, program modules or other data in a modulated data signal such as a carrier wave or other transport mechanism and includes any information delivery media. Modulated data signal is a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media. Although not shown, RAM 105 may include one or more are applications representing the application data stored in RAM memory 105 while the computing device is on and corresponding software applications (e.g., software tasks), are running on the computing device 101.

Communications module 109 may include a microphone, keypad, touch screen, and/or stylus through which a user of computing device 101 may provide input, and may also include one or more of a speaker for providing audio output and a video display device 111 for providing textual, audio-visual and/or graphical output. Software may be stored within memory 115 and/or storage to provide instructions to processor 103 for enabling computing device 101 to perform various functions. For example, memory 115 may store software used by the computing device 101, such as an operating system 117, application programs 119, and a data store 121. Alternatively, some or all of the computer executable instructions for computing device 101 may be embodied in hardware or firmware (not shown). As described in detail below, the data store 121 may provide centralized storage of account information and account holder information for the entire business, allowing interoperability between different elements of the business residing at different physical locations. In some embodiments, the data store 121 may be physically located external to memory 115. For example, the data store 121 may be an enterprise database located at computing device 151.

Computing device 101 may operate in a networked environment supporting connections to one or more remote computing devices, such as branch terminals 141 and 151. The branch computing devices 141 and 151 may be personal computing devices or servers that include many or all of the elements described above relative to the computing device 101. The network connections depicted in FIG. 1 include a local area network (LAN) 125 and a wide area network (WAN) 129, but may also include other networks. When used in a LAN networking environment, computing device 101 is connected to the LAN 125 through a network interface or adapter in the communications module 109. When used in a WAN networking environment, the server 101 may include a modem in the communications module 109 or other means for establishing communications over the WAN 129, such as the Internet 131. It will be appreciated that the network connections shown are illustrative and other means of establishing a communications link between the computing devices may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, an application program 119 used by the computing device 101 according to an illustrative embodiment of the invention may include computer executable instructions for invoking user functionality related to communication, such as email, short message service (SMS), and voice input and speech recognition applications.

Figure 2:
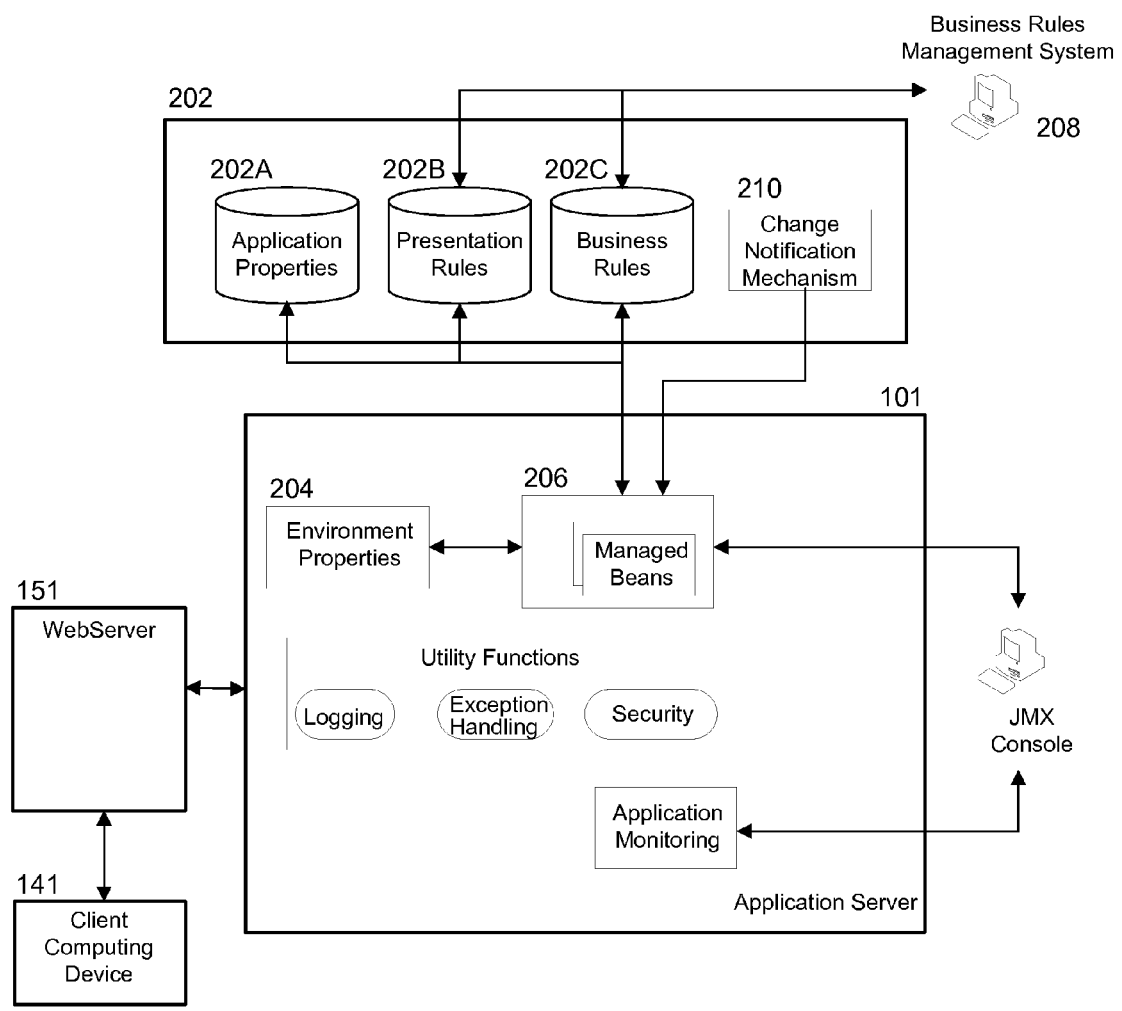
FIG. 2 illustrates one embodiment of a system in accordance with aspects of the disclosure.

FIG. 2 illustrates one embodiment of a system in accordance with aspects of the disclosure. A client computing device 141 may communicate with a webserver 151 that in turn may communicate with an application server 101. The client computing device 141 may include a display for showing a user the graphical user interface of the application. As such the application server may include a display interface configured to send a graphical user interface to the display device. The display interface may construct the graphical user interface corresponding to the application by using the business rules (or the modified business rules). For example, illustrative embodiments of such rules in accordance with aspects of the invention may be found in relation to the description of FIG. 4.

The application server 101 may access data (e.g., application properties, presentation rules, business rules, and the like) stored on a data storage system 202 (e.g., a database system). One skilled in the art will appreciate that although various components in FIG. 2 are visually depicted as being located in a particular device, the disclosure contemplates one or more components being located in a different device or being omitted. For example, in one embodiment the application server 101 and data storage system 202 may be located in a webserver 151. In yet another embodiment in accordance with the disclosure, the data storage system 202 may be located inside the application server 101, or one or more components from data storage system 202 and application server 101 may be located (or co-located) in other blocks of FIG. 2.

The system of FIG. 2 may include a data storage system 202 configured to hold data for use by one or more applications executing in an application server 101. The data storage system 202 may store data including at least one or more of the following: application properties 202A, presentation rules 202B, and/or business rules 202C. Examples of illustrative data stored in the data storage system 202 are depicted in FIG. 4, which is described in further detail below. The data storage system 202 may include computer memory (e.g., tangible computer-readable medium) for storing the one or more business rules (e.g., first business rule, second business rule, and the like) In addition, a business rules management system 208 (BRMS) may be provided to assist in creating, modifying and/or maintaining the various data stored in the data storage system 202. The BRMS may provide a user friendly graphical user interface (GUI) to allow business users with little to no computer programming (and webpage authoring) experience to create, modify, and maintain the presentation and configuration of an online application (e.g., a website) running with the assistance of a virtual machine.

The data store 202 (e.g., database system) may further include a change notification mechanism 210. The change notification mechanism may provide notifications of modification of data (e.g., application properties 202A, presentation rules 202B, business rules 202C, and the like) The notification may take the form of, for example in one embodiment, an alert over an IRQ (interrupt request) line. In another embodiment, the notification may be software-implemented using the well-documented "observer" design pattern where a "subject" and an "observer" are loosely coupled, and the subject provides notification to an observer when the subject changes state. One skilled in the art will appreciate that other configurations or design patterns are known in the art and may be used to provide notifications of modifications (e.g., state changes) of data, such as polling techniques, push techniques, and subject-observer implementations. In addition, the application server 101 may contain an interface to the change notification mechanism 210 so as to enable the receipt of notifications. For example, the application server 101 may include an instantiation of an "observer" configured to obtain notifications of business rule modifications from a "subject" in the data storage system 202.

In accordance with various aspects of the disclosure, an application server 101 might not rely on a virtual machine to execute computer-executable instructions. In other embodiments, the application server 101 may include a virtual machine 206 configured to use a processor (e.g., microprocessor, multi-core processor, special-purpose processor and others) to execute computer-executable instructions. These instructions may include bytecode configured to be executed by the virtual machine to cause the system of FIG. 2A to perform one or more steps identified in FIG. 3 (and throughout this disclosure). The virtual machine 206 may include managed beans to assist in managing resources (e.g., environment properties file(s) 204, application properties, and the like) and/or performing one or more of the aforementioned steps. These objects are well-known in the art and may be used in conjunction with JMX (e.g., a JMX console) to assist in monitoring aspects of the one or more applications running on the virtual machine 206.

In accordance with various aspects of the disclosure, the virtual machine 206 may also include a rules control mechanism configured to permit an application running on the virtual machine to access a first set of business rules, while concurrently restricting the application from accessing a second set of business rules. Meanwhile, the rules control mechanism may permit a second application also running on the virtual machine 206 to access the second set of business rules, but restrict that application's access to the first set of business rules. One of skill in the art will recognize that at least one benefit of a system with a virtual machine 206 with the rules control mechanism is the ability to restrict visibility of properties (e.g., business rules, presentation rules, environment properties 204, and the like) at the level of the application. For example, different applications may then have the same names for properties without conflict. Therefore, interchangeability of underlying vendor products and future porting are greatly enhanced and simplified. In one embodiment in accordance with the disclosure, the rules control mechanism may be implemented using managed beans (see 206 in FIG. 2). In another embodiment in accordance with the disclosure, the rules control mechanism may be implemented through computer-executable instructions stored on a tangible computer-readable medium of the application server 101 and executed by the virtual machine 206.

In addition, the system of FIG. 2 may include utility functionality to assist in the dynamic configuration of properties. For example, a logging module may be included to record the login of the user that edits a property value (e.g., business rule, and the like) and the date/time when the modification occurred (e.g., by populating "modified_by" and "modified_date" fields in a log table). The logged information may provide, inter alia, an audit trail for modifications to business rules, presentation rules, application properties, environment properties, and the like. In another embodiment, the logging module may provide the ability to designate the level of detail to record in application logs. For example, a logging level of "5" may indicate that all error messages and warning messages generated by the application should be recorded in a log file. (See FIG. 4, ref 408). In addition, modules for other utility functions (e.g., exception handling module and security module in FIG. 2) may be provided to assist application developers and testers in handling exceptions and security. For example, a security module may provide information about what application developers and/or business users may modify which properties. At least one benefit of a security module is that it may prevent lay business users from accessing and mistakenly modifying a property value that could cause the entire system to crash (e.g., generate a fatal error message or other undesirable behavior.)

Figure 3:
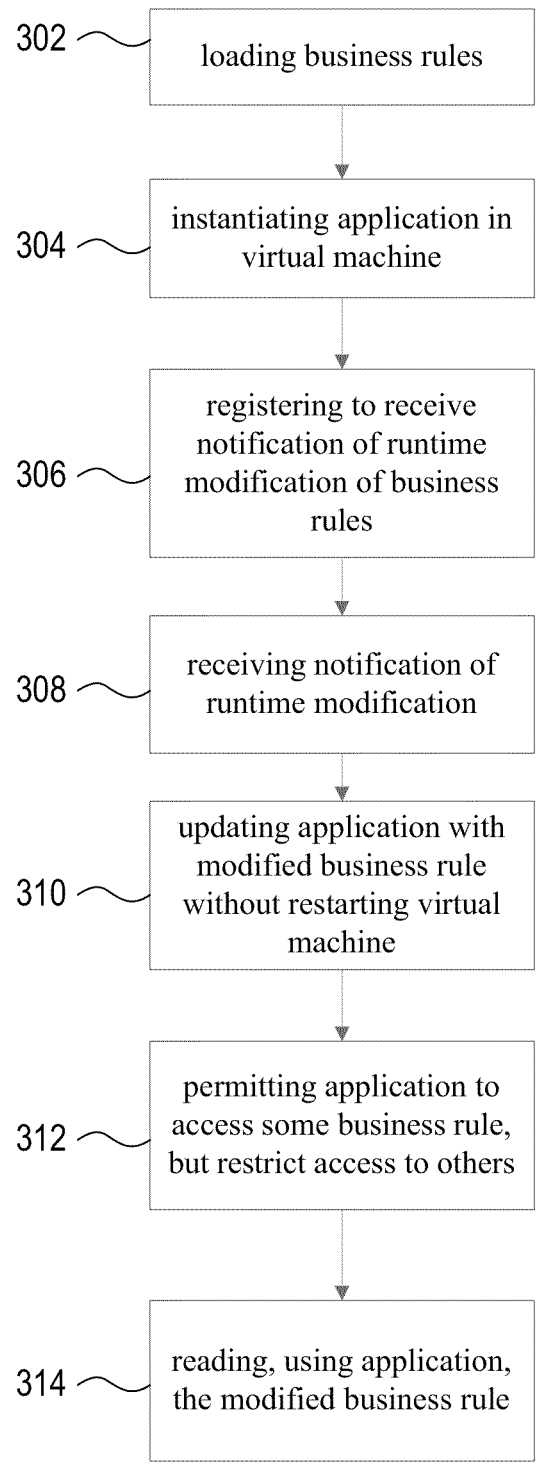
FIG. 3 is a flowchart illustrating one embodiment of a method in accordance with aspects of the disclosure.

FIG. 3 is a flowchart illustrating one embodiment of a method in accordance with aspects of the disclosure. One or more aspects of the method may be implemented using a system (e.g., the system illustrated in FIG. 2.) In step 302, rules (e.g., business rules, presentation rules, application properties, and the like) may be loaded from the data storage system 202 and other memories at the startup of the virtual machine 206. These rules may be read into the virtual machine 206 and/or may be used to initialize one or more settings of the virtual machine 206 (e.g., environment properties 204). Subsequent changes made to rules after the virtual machine has been started may be referred to as runtime modifications. Many runtime modifications are performed by manually by users (e.g., business users).

In step 304, an application may be instantiated in the virtual machine 206. The application may be an eCommerce website with Java Server Pages (JSP) running on the virtual machine 206. In such an example, the application may use one or more of the rules/properties which the virtual machine 206 loaded in step 302. For example, the application may reply on the value of a pilotMode parameter (e.g., see FIG. 4) to determine whether the application should be running in pilot testing mode or in production mode. Other examples of parameter-value pairings are illustrated in FIG. 4.

In step 306, the application running on the virtual machine 206 may register to receive notifications of runtime modifications of the rules/properties. As explained with respect to the change notification mechanism 210 of FIG. 2, the application server 101 may register to receive notifications when a rule stored in the data storage system 202 has been modified. The virtual machine 206 may include an interface to communicate with the change notification mechanism 210. As such, in step 308, the virtual machine 206 and/or the application may receive a notification of a runtime modification of a business rule. In one embodiment, the change notification mechanism 210 is executing on the data storage system 202 outside of the virtual machine 206. In another embodiment, the change notification mechanism may be running on the application server 101, but outside of the application's virtual machine 206.

In step 310, without requiring a restart of the virtual machine 206, the modified business rule may be received and the update reflected in the running application. One of skill in the art will appreciate the importance of updating the application to recognize the modified business rule without requiring a shutdown and start-up of the underlying virtual machine 206. A restart of the virtual machine 206 would require the application to go down (i.e., downtime or inactive state) for a moment. This is unacceptable/undesired in applications where continuous all-day access is desired. Moreover, if any users are using the application during the time of the restart, they may be prematurely aborted from the application. At least one benefit of aspects of the disclosed embodiment is the ability to overcome the shortcoming of a virtual machine restart.

In step 312, a rules control mechanism, in one example, may permit an application running on the virtual machine 206 to access a first business rule (or set of business rules), but restrict the application from accessing a second business rule (or set of business rules). Meanwhile, the rules control mechanism may permit a different application to access the second business rule(s), while restricting that application from accessing the first business rule(s). As described above, at least one benefit of aspects of the disclosed embodiment is the ability to avoid conflicts between parameters/properties from different applications running (or configured to run) on the virtual machine 206.

In step 314, the application may read the modified business rule(s) and adjust its operation or functionality accordingly. For example, if the modified business rule is regarding the extent of logging (e.g., Ref 408 in FIG. 4) performed by the application, then an update of the value of that property/parameter from a value of "5" to a value of "2" may decrease the detailed logging performed by the application. In another example, if the modified business rule is regarding a forced cache refresh (e.g., Ref 414 in FIG. 4) performed by the application, then an update of the value of that property/parameter from a value of "TRUE" to a value of "FALSE" may stop forced cache cleanings performed by the application. In general, the application update may occur nearly immediately after the rule (e.g., application properties 202A) is modified (e.g., by a business user using a business rules management system 208), and the change notification mechanism 210 sends a notification to the virtual machine 206 running in the application server 101. In particular, the virtual machine 206 need not be restarted for the modified business rule to take effect.

Referring to FIG. 4, an illustrative rules file 400 in accordance with aspects of the disclosure is shown. The rules may adhere to a dot-delimited naming convention to permit the rules to be grouped. For example, rules related to a particular website may include rules 406, 408, 410, 412, 414. The rules are named, in the example of FIG. 4, with a prefix followed by specific properties. Meanwhile, rules related to another particular website may include rules 402, 404. At least one benefit of such a naming convention is that the rules control mechanism in the virtual machine 206 may easily permit or restrict an application's access to properties/parameters accordingly.

Furthermore, the business rules in the illustrative rules file 400 of FIG. 4 may include rules involve functional entitlements, page flows, or content retrieval. For example, rule 404 may direct the application in page flows. In particular, rule 404 may take a user of a particular site to an "information verification" screen/page after login (i.e., login Next). In another example, rule 402 may direct the application in functional entitlements. In particular, rule 402 may display mortgage calculator functionality on a particular site. In yet another example, rule 406 may direct the application in content retrieval. In particular, rule 406 may direct the application of a particular website to retrieve the content for its site from the "contentserver2" content server. In other examples, the rules file 400 may include rules involving log levels 408, connection pool parameters 410, pilot mode toggles, forced cache refreshes 414, and color 412. For example, the color rule 412 may correspond to the look & feel of the application's graphical user interface (e.g., the background color of the website is made blue). One skilled in the art will appreciate that rules may be stored in a file format 400 or other format (e.g., in a SQL table in a relational database, and the like) on the data storage system 202.

Although not required, one of ordinary skill in the art will appreciate that various aspects described herein may be embodied as a method, a data processing system, or as a computer-readable medium storing computer-executable instructions. Aspects of the invention have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure. In addition, the steps described herein may be performed using a processor executing computer-executable instructions stored on a computer-readable medium. The processor may also be in communication with a display screen for outputting the appropriate information in accordance with aspects of the invention.

We claim:
1. A computer apparatus, comprising:
a virtual machine configured to use a processor to execute computer-executable instructions;
a non-transitory computer-readable medium storing business rules and presentation rules, the business rules comprising at least a first business rule and a second business rule, the presentation rules comprising a first presentation rule and a second presentation rule;
an interface to a change notification mechanism executing outside the virtual machine that is configured to provide notifications of modifications to the business rules;

the non-transitory computer-readable medium further storing the computer-executable instructions that when executed by the processor cause the apparatus to perform a method comprising:

instantiating a first application in the virtual machine with the business rules;

registering the first application with the change notification mechanism to receive runtime notifications of runtime modifications to the business rules, wherein the runtime notifications are sent from the change notification mechanism whenever a runtime modification is made by a rules management system operating outside the non-transitory computer-readable medium and change notification mechanism;

receiving, by the first application, notification of a runtime modification of the business rules;

and updating the first application with the modified business rules without restarting the virtual machine;

the apparatus further comprising a rules control mechanism configured to:

permit the first application to access the first business rule and the first presentation rule, but restrict the first application's access to the second business rule and the second presentation rule; and permit a second application to access the second business rule and the second presentation rule, but restrict the second application's access to the first business rule and the first presentation rule.

2. The apparatus of claim 1, where the non-transitory computer-readable medium is part of a database system.

3. The apparatus of claim 2, where the database system comprises the change notification mechanism associated with a data store.

4. The apparatus of claim 1, where the runtime modification is a change in the business rules stored on the non-transitory computer-readable medium after the virtual machine has been started, where the change is manually performed by a person.

5. The apparatus of claim 1, where the rules control mechanism uses a dot delimited naming convention to group the business rules.

6. The apparatus of claim 1, where the business rules include a rule involving at least one of functional entitlements, page flows, and content retrieval.

7. The apparatus of claim 1, where the business rules include a rule involving at least one of log levels, connection pool parameters, pilot mode toggles, and forced cache refreshes.

8. The apparatus of claim 1, further comprising:

a display interface configured to send a graphical user interface to a display device;

and the non-transitory computer-readable medium further storing computer-executable instructions that when executed by the processor cause the apparatus to perform the method further comprising:

constructing the graphical user interface corresponding to the first application using the modified business rules.

9. A method, comprising:

loading business rules and presentation rules from a data store at a startup of a virtual machine, wherein the business rules comprise at least a first business rule and a second business rule, and wherein the presentation rules comprise at least a first presentation rule and a second presentation rule;

registering the virtual machine with a change notification mechanism executing on the data store to receive runtime notifications of runtime modifications of the business rules, wherein the runtime notifications are sent from the change notification mechanism whenever a runtime modification is made by a rules management system outside the data store;

instantiating a first application in the virtual machine;

receiving, by the virtual machine, a notification of runtime modification of a business rule;

updating the first application with the modified business rule without stopping the virtual machine;

permitting the first application to access the first business rule and the first presentation rule;

restricting the first application from accessing the second business rule and the second presentation rule;

permitting a second application to access the second business rule and the second presentation rule; and restricting the second application from accessing the first business rule and the first presentation rule.

10. The method of claim 9, where the business rules are defined in a name-value configuration, where the name is dot delimited.

11. The method of claim 10, where the business rules designate a look & feel of the first application's graphical user interface.

12. The method of claim 10, where the business rules include a rule involving at least one of functional entitlements, page flows, content retrieval, log levels, connection pool parameters, pilot mode toggles, and forced cache refreshes.

13. A non-transitory computer-readable medium comprising computer-executable instructions that cause an apparatus to perform a method comprising:

loading business rules and presentation rules from data store after starting a virtual machine, where the business rules include a first business rule and a second business rule, and where the presentation rules include a first presentation rule and a second presentation rule;

instantiating a first application in the virtual machine;

registering the first application with a change notification mechanism executing outside the virtual machine, to receive runtime notifications of runtime modifications of business rules, wherein the runtime notifications are sent from the change notification mechanism whenever a runtime modification is made by a rules management system outside the data store;

receiving, by the first application, a notification of the runtime modification of the first business rule;

updating the first application with the modified first business rule without restarting the virtual machine;

permitting the first application to access the first business rule and first presentation rule; and restricting the first application from accessing the second business rule and the second presentation rule;

permitting a second application to access the second business rule and the second presentation rule; and restricting the second application from accessing the first business rule and the first presentation rule.

14. The non-transitory computer-readable medium of claim 13, further comprising computer-executable instructions that cause an apparatus to perform a method comprising:

reading, using the first application, the first modified business rule, where the first modified business rule determines an extent of logging performed by the first application.

15. The non-transitory computer-readable medium of claim 13, further comprising computer-executable instructions that cause an apparatus to perform a method comprising:

reading, using the first application, the first modified business rule, where the first modified business rule determines when a cache refresh occurs.

\* \* \* \* \*